No. 615,595. Patented Dec. 6, 1898.
A. WAGNER.
PEDAL ATTACHMENT FOR BICYCLES.
(Application filed Oct. 29, 1897.)
(No Model.)

Witnesses.

Inventor
Albert Wagner,
By James L. Norris.
Atty.

UNITED STATES PATENT OFFICE.

ALBERT WAGNER, OF CHICAGO, ILLINOIS.

PEDAL ATTACHMENT FOR BICYCLES.

SPECIFICATION forming part of Letters Patent No. 615,595, dated December 6, 1898.

Application filed October 29, 1897. Serial No. 656,836. (No model.)

*To all whom it may concern:*

Be it known that I, ALBERT WAGNER, a citizen of the United States, residing at Chicago, in the county of Cook and State of Illinois, have invented new and useful Improvements in Pedal Attachments for Bicycles, of which the following is a specification.

My invention relates to an improved means detachably connected to the ordinary pedals of a bicycle whereby to vary the length of stroke as desired in order to change the strain upon the muscles of the rider.

The invention consists in removably attaching to the ordinary pedals of a bicycle extension-plates the upper bearing-surfaces of which extend considerably above the bearing-surfaces of the pedals and which have their upper surfaces serrated to form foot-rests.

Figure 1:
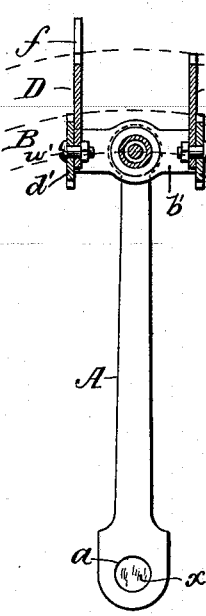
Figure 2:
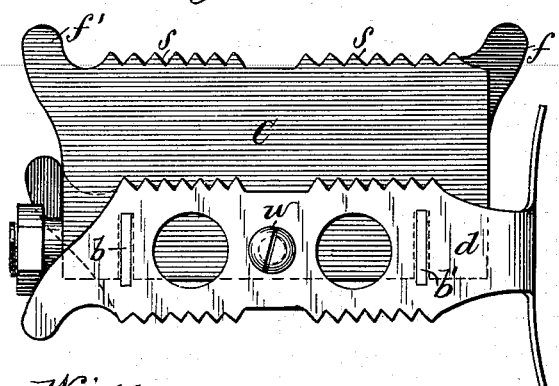
Figure 3:
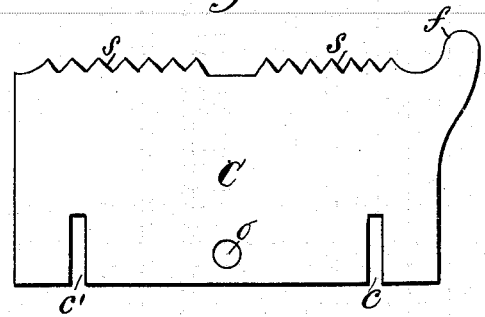

In the accompanying drawings, illustrating the invention, Figure 1 is a view in elevation of an ordinary bicycle-crank, showing a pedal with my improved plates applied thereto in section and showing in dotted lines the paths traversed by the various parts of the pedal. Fig. 2 is a side view of a pedal with the plates attached, and Fig. 3 is an elevation of one of the plates.

The letter A designates the crank of an ordinary bicycle, which is attached at $a$ to the crank shaft or axle $x$.

B indicates the pedal, which may be of the ordinary construction, but is preferably made as a "rat-trap" pedal.

The letters C D indicate two flattened extension-plates applied, as hereinafter described, to the pedal B. As shown in Fig. 3, each one of these plates is formed of a single piece of metal, which may be stamped from steel, and is provided on its under side near each end, respectively, with notches or slots $c\ c'$, which are the same distance apart as the brace-bars $b\ b'$, connecting the two side members $d\ d'$ of the pedal B. Centrally between the slots $c\ c'$ the plates are provided with an opening $o$. On their upper surfaces the plates C D are serrated, as at $s$, the plate C having an outer stop $f$ and the plate D an inner stop $f'$ to prevent the foot slipping laterally from the plates in either direction.

The plates C D are applied to a pedal at each side thereof, so that the slots $c\ c'$ fit over the brace-bars $b\ b'$, and screw-bolts $w\ w'$ are passed from the outside of the members $d\ d'$ through the opening $o$ in each plate, and nuts $n\ n'$ are then applied to the threaded ends of the bolts to lock the plates firmly in position.

The operation of the improvements will be readily understood. For ordinary riding the reverse sides of the pedals, or the sides not having the extension-plates attached, are employed. When it is desired to vary the length of stroke, as for climbing a hill, the rider by a movement of the foot similar to that used by riders in bringing the ordinary toe-clip carried by a pedal into position, rotates the pedals to bring the plates C D to an upper extended position, when his feet will engage the upper serrated surfaces of said plates, which now afford a pedal-bearing for the foot. When it is desired to employ the ordinary leverage of the cranks, the feet are simply removed for an instant from the plates, when by force of gravity they will swing to a reverse position from that shown and present the bearing-surface of the pedal proper to the feet of the rider. Either bearing-surface may be employed from time to time, as described, to change the strain upon the muscles of the rider, and thus rest them.

Having thus fully described my invention, what I claim as new, and desire to secure by Letters Patent, is—

The combination with a pedal composed of two side members rigidly connected near their end portions by cross-braces, of two opposite flattened extension-plates lying against the inner sides of the said side members and extending above the normal bearing-surface of one side of the pedal, and means for detachably securing the flattened plates to said side members, substantially as described.

In testimony whereof I have hereunto set my hand in presence of two subscribing witnesses.

ALBERT WAGNER.

Witnesses:
 FRED S. CLAY,
 RICHARD L. BEATTIE.